| United States Patent [19] | [11] Patent Number: 4,664,352 |
|---|---|
| Shibuki et al. | [45] Date of Patent: May 12, 1987 |

[54] SUSPENSION DEVICE FOR VEHICLE SEAT

[75] Inventors: Osamu Shibuki, Nagoya; Noboru Matsuyama, Handa; Yoichi Umemura, Anjo; Atsushi Kamiya, Kariya; Takaya Fujii, Toyoake; Masayuki Seki, Kariya; Norio Ohta, Okazaki, all of Japan

[73] Assignee: Toyota Shatai Kabushiki Kaisha, Kariya, Japan

[21] Appl. No.: 795,648

[22] Filed: Nov. 6, 1985

[30] Foreign Application Priority Data

Mar. 12, 1985 [JP] Japan .................................. 60-34864

[51] Int. Cl.$^4$ ........................................... F16M 13/00
[52] U.S. Cl. .................... 248/562; 248/608; 248/590; 297/301
[58] Field of Search .............. 248/562, 608, 593, 590, 248/595, 596, 632; 297/301, 306, 307; 296/65 R

[56] References Cited

U.S. PATENT DOCUMENTS

| 3,724,797 | 4/1973 | Freitag et al. ...................... 248/593 |
| 3,853,296 | 12/1974 | Forssell ............................ 248/608 X |
| 3,874,626 | 4/1975 | Gross et al. ........................ 248/562 |
| 3,912,248 | 10/1975 | Pickford et al. ................ 248/562 X |
| 4,521,057 | 6/1985 | Varterasian et al. ........... 248/562 X |

Primary Examiner—Ramon O. Ramirez
Attorney, Agent, or Firm—Cushman, Darby & Cushman

[57] ABSTRACT

A suspension device for a vehicle seat has a lower frame secured to a vehicle floor, an upper frame disposed above the lower frame in parallel for mounting the vehicle seat, link plates disposed in parallel on the front side and the rear side of a vehicle for connecting the lower frame and the upper frame, torsion springs disposed near the connecting portion of the link plates for imparting elastic support force to the link plates, and a shock absorber disposed between the lower frame and the upper frame for damping the relative vibration of the above two frames.

25 Claims, 37 Drawing Figures

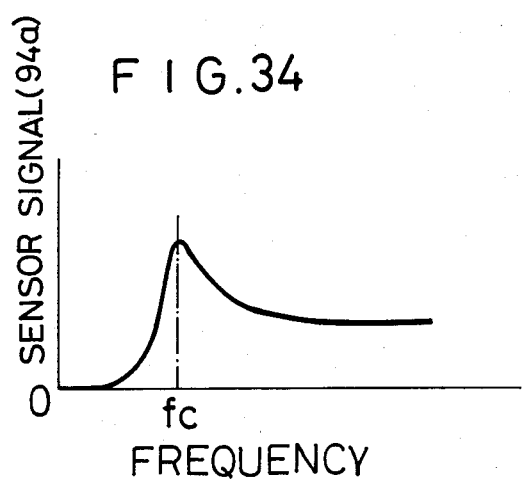

SUSPENSION DEVICE FOR VEHICLE SEAT

BACKGROUND OF THE INVENTION

1. Field of the Invention

The present invention relates to a suspension device for elastically supporting a vehicle seat on a vehicle floor to prevent vibrations of a vehicle from being transmitted to the vehicle seat.

2. Description of the Prior Art

As the cushion property of the vehicle seat becomes high, the seat excessively sinks due to the large weight of an occupant to worsen comfortable riding in a vehicle or visibility and drivability in the driving condition. Under the above circumstances, it has been proposed to support the whole seat by a suspension device having a spring and a shock absorber in place of increasing the cushion property of the vehicle seat in vehicles wherein it is difficult to reduce vehicle vibrations, such as a truck and the like.

Recently, the above described suspension device has been strongly required to be installed in small-sized vehicles and accordingly a compact and durable suspension device having a simple construction has been desired.

SUMMARY OF THE INVENTION

It is an object of the present invention to provide a suspension device for a vehicle seat which is simple in construction, compact and excellent in durability.

The suspension device for elastically supporting a vehicle seat on a vehicle floor and preventing the transmission of vibration to the vehicle seat, comprises:
a lower frame secured to the vehicle floor;
an upper frame disposed above said lower frame in parallel with the lower frame for mounting the vehicle seat;
link plates disposed on the front side and the rear side of a vehicle in parallel with each other for connecting the lower frame and the upper frame; and
at least one torsion spring made of a spring rod of which both ends are twisted to each other at a predetermined angle about a twist center.

The torsion spring is provided near one of the connecting portions of the link plates and the lower and upper frames.

The spring rod is supported by one of the lower frame and the upper frame, which is positioned near the torsion spring. One end of the torsion spring is in contact with one of the lower frame and the upper frame, which supports the spring rod and the other end of the torsion spring is connected to a middle portion of one of the link plates.

The torsion spring twists with the relative displacement of the upper frame and the lower frame to impart elastic supporting force to the link plate to which the torsion spring is connected.

The suspension device of the present invention further comprises a shock absorber provided between the lower frame and the upper frame for damping the relative vibration of the lower frame and the upper frame.

BRIEF DESCRIPTION OF THE DRAWINGS

FIG. 1 is a top plan view of the suspension device;
FIG. 2 is a side view of the suspension device;
FIG. 3 is a partial perspective view taken in the direction of the arrow A of FIG. 1;
FIG. 4 is a sectional view taken along the line IV—IV of FIG. 3;
FIG. 5 is a sectional view taken along the line V—V of FIG. 4;
FIG. 6 is a sectional view taken along the line VI—VI of FIG. 4;
FIG. 7 is a sectional view taken along the line VII—VII of FIG. 4;
FIG. 8 is a sectional view taken along the line VIII—VIII of FIG. 4;
FIGS. 9 and 10 are front views of a link plate;
FIG. 11 is a longitudinal sectional view of a shock absorber;
FIG. 12 is a sectional view of a piston portion of the shock absorber;
FIG. 14 is a side view of the suspension device;
FIG. 15 is a perspective view of the shock absorber;
FIG. 16 is a longitudinal sectional view of the shock absorber;
FIG. 17 is a view taken in the direction of the arrow B of FIG. 16;
FIG. 18 is a front view of a cam plate;
FIG. 19 is a view illustrating the variation of the damping force of the shock absorber;
FIG. 20 is a perspective view of the shock absorber;
FIG. 21 is a front view of the shock absorber;
FIG. 22 is a view illustrating the variation of the damping force of the shock absorber;
FIG. 23 is a longitudinal sectional view of the shock absorber;
FIG. 24 is a view illustrating the frequency characteristic of the magnification of vibrations of the suspension device;
FIG. 27 is a sectional view of the piston portion of the shock absorber;
FIG. 28 is a perspective view of a cap;
FIG. 29 is a front view of the end surface of an axis of rotation taken along the arrow E of FIG. 28;
FIGS. 32 to 34 illustrate a tenth embodiment of the suspension device according to the present invention;
FIG. 32 is a view illustrating the structure of a control device;
FIG. 34 is a view illustrating the frequency characteristic of a detected signal.

DETAILED DESCRIPTION OF THE INVENTION

FIGS. 1 to 12 illustrate a first embodiment of a suspension device according to the present invention.

Figure 1:
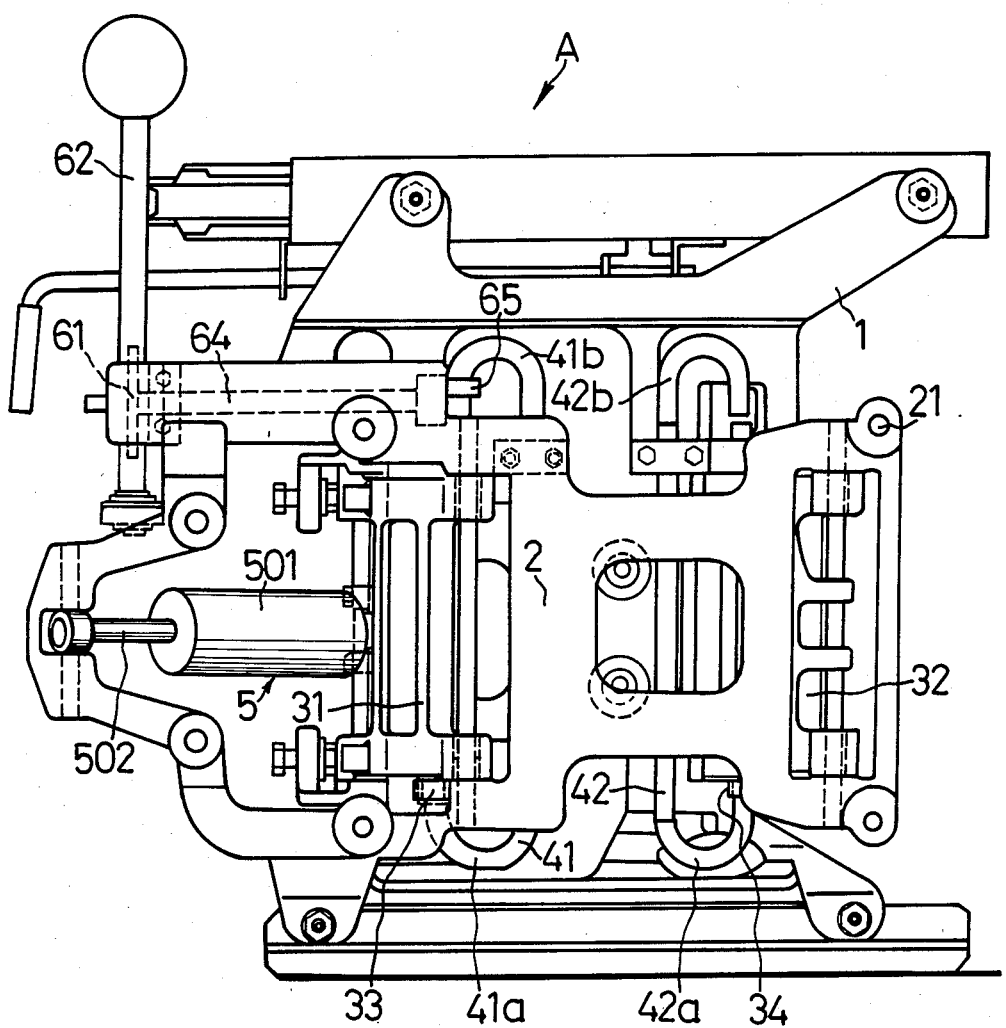
FIGS. 1 to 12 illustrate a first embodiment of a suspension device according to the present invention.
Figure 2:
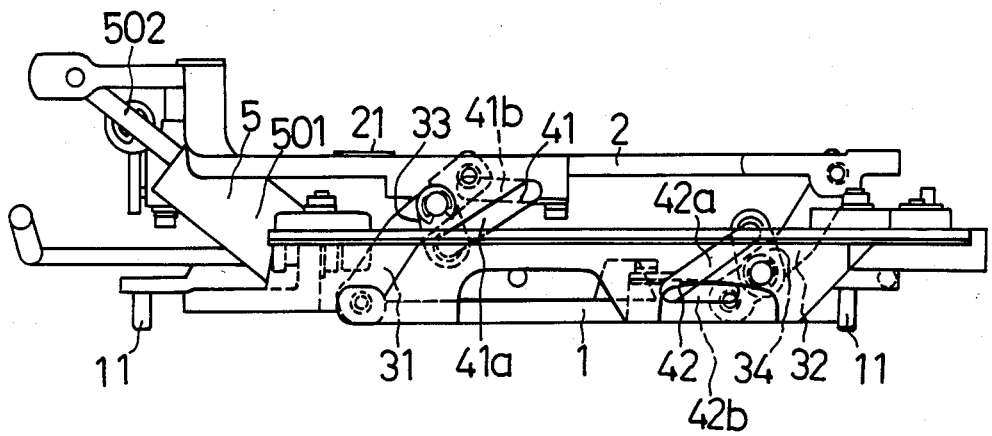

FIG. 1 is a top plan view of the suspension device and FIG. 2 is a side view thereof. The suspension device comprises a lower frame 1 and an upper frame 2 provided above the lower frame 1. The lower frame 1 is secured to a vehicle floor (not shown) by means of bolts 11 (FIG. 2) and on the upper frame 2 a veicle seat is mounted (not shown) by means of installing portions 21.

The two frames 1 and 2 are connected to each other by means of link plates 31 and 32 which are arranged on the front side and the rear side of a vehicle (=the left side and the right side in FIG. 1) in parallel. The frame 2 is movable upward and downward while being held in the horizontal position with respect to the frame 1.

To one side surface of each of the link plates 31 and 32 is connected one end of each of the sub-links 33 and 34 and to the other end of each of the sub-links 33 and 34 is connected each of torsion springs 41 and 42 for imparting spring support force to the link plates 31 and 32 therethrough.

The torsion spring 41 is disposed under the upper frame 2 so as to traverse it and is fixed to the under surface thereof. Both ends of the torsion spring 41 are bent into a "U" shape configuration and one end portion 41a is twisted downward by a predetermined angle and is connected to the sub-link 33.

The torsion spring 42 is disposed on and secured to the upper surface of the lower frame 1.

Both ends of the torsion spring 42 are bent into a "U" shape configuration and one end portion 42a is twisted upward and is connected to the sub-link 34.

When an occupant sits on a seat, the upper frame 2 moves downward due to his load. This results in the link plates 31 and 32 being fallen rearward. Accordingly, the torsion springs 41 and 42 are deformed in such a direction to decrease the angle between each of the ends 41a and 42a and each of the ends 41b and 42b (that is the twisted angle) to generate spring force.

The above process will be explained in detail with reference to the link plate 31.

Figure 9:
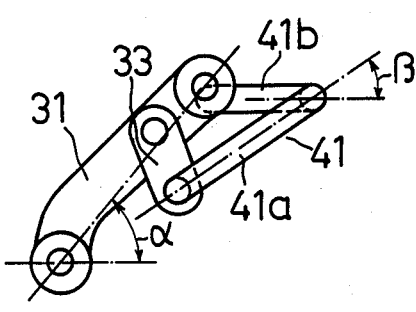

FIG. 9 illustrates the state before load is applied to the link plate 31. In FIG. 9, the link plate 31 is inclined rearward by an angle $\alpha$ and one end 41a of the torsion bar 41 makes an angle $\beta$ with the other end 41b thereof.

Figure 10:
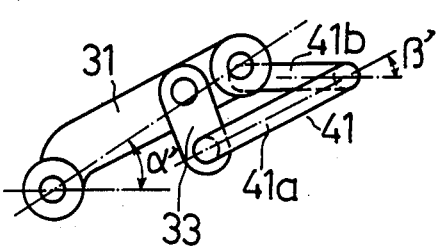

When load is applied, the link plate 31 is further inclined as shown in FIG. 10 to make a decreased angle $\alpha'$. As the link plate 31 is inclined, the twisted angle of the torsion spring 41 connected to the sub-link plate 33 is also decreased to $\beta'$ to generate spring force. Thus, the upper frame 2 is elastically supported on a lower frame 1 by means of the link plate 31 to which spring support force is imparted.

In this case, the variation $(\beta - \beta')$ of the twisted angle of the torsion bar 41 is smaller than that $(\alpha - \alpha')$ of the inclined angle of the link plate 31.

Figure 3:
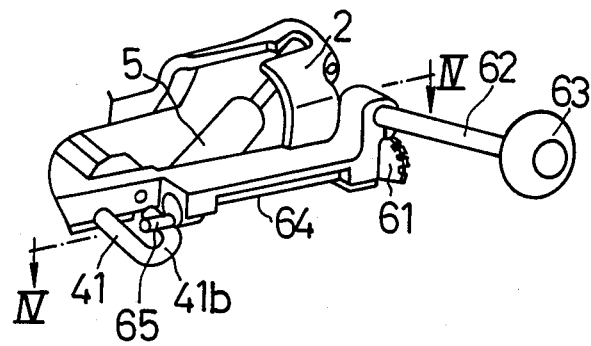
Figure 4:
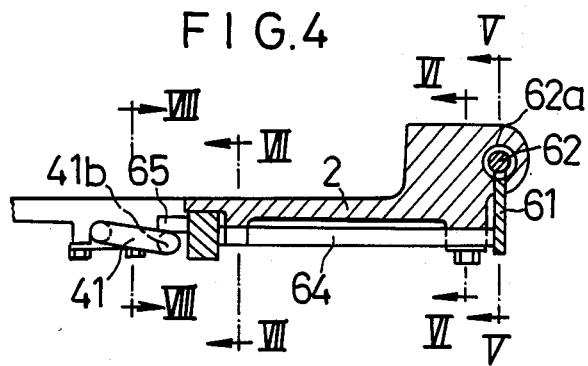
Figure 5:
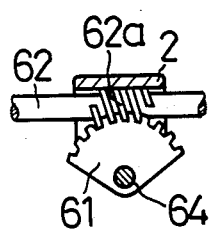
Figures 6, 7:
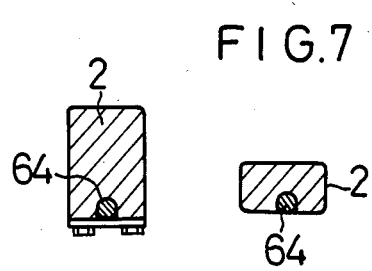
Figure 8:
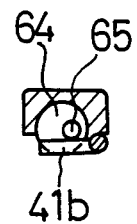

Along the side edge of the under surface of the upper frame 2 is disposed a shaft 64 (FIG. 1). The shaft 64 is connected to a sideward projecting adjusting handle 62 by means of a worm gear mechanism described later (FIGS. 3 and 4). The shaft 64 is rotatably fitted into a groove (unnumbered) formed in the under surface of the upper frame 2 as shown in FIGS. 6 and 7. The base end of the shaft 64 is provided with a fan-shaped worm wheel 61. The worm wheel 61 is engaged with a worm portion 62a formed in the adjusting handle 62 as shown in FIG. 5. By turning the handle 62 by a grip 63, the shaft 64 is turned. The top end of the shaft 64 is of a larger diameter. From the end surface of the top end of the shaft 64 is projected an eccentric pin 65 as shown in FIG. 8. The eccentric pin 65 is in contact with the upper surface of the other end 41b of the torsion spring 41.

When the handle 62 is turned by the grip 63, the eccentric pin 65 is also turned to press and deform the other end 41b of the torsion spring 41 downward. This results in the twisted amount of the torsion spring 41 being increased and accordingly the initial spring force occurring when the occupant sits on the seat being increased.

By turning the eccentric pin 65 in the direction opposite to that described above, the twisted amount of the torsion spring 41 can be decreased and the elastically supporting force can be reduced.

The reference nuneral 5 denotes a shock absorber achieving the vibration damping operation. The shock absorber 5 has a cylinder 501 of which the lower end is connected to the lower frame 1, and a piston rod 502 which projects from the cylinder 501 and of which the top end is connected to the upper frame 2. The piston rod 502 expands and contracts with the relative vibration of the frames 1 and 2.

Figure 11:
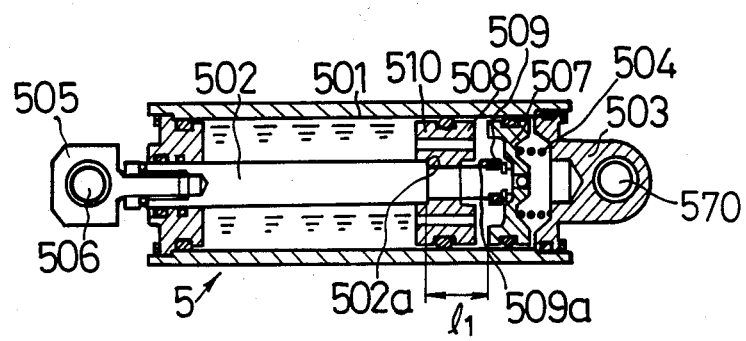

The structure of the shock absorber 1 is illustrated in FIG. 11 in detail. In FIG. 11 the cylinder 501 is connected to the lower frame 1 through a hole 570 provided in an eyelet 503 closely inserted in one end portion of the cylinder 501. The piston rod 502 penetrating the center of the cylinder 501 is connected to the upper frame 2 through a hole 506 of an eyelet 505 provided in the base end of the piston rod 502. Within the cylinder 501, a movable wall 507 which is movable leftward and rightward along the inner wall of the cylinder 501, is provided for sealing a charged liquid. The top end of the piston rod 502 is in contact with the movable wall 507. The movable wall 507 is elastically supported by a coil spring 504 disposed between the movable wall 507 and the eyelet 503.

Within the cylinder 501, a piston 508 is further provided so as to be movable leftward and rightward along the inner wall of the cylinder 501 for separating the charged liquid. The top end portion of the piston rod 502, which has a smaller diameter is slidably inserted into a central hole of the piston 508 and is provided with a stopper key 509.

The movement of the piston 508 is limited to a fixed amount $l_1$ by the stepped surface 502a of the piston rod 502 as one of stopper surfaces and by the side surface 509a of the stopper key 509 as the other stopper surface.

Figure 12:
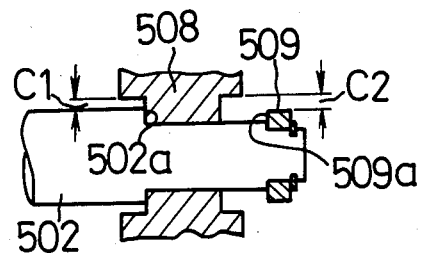

The central hole of the piston 508 through which the piston rod 502 penetrates is defined by a stepped surface thereof as shown in FIG. 12 and small gaps $C_1$ and $C_2$ are formed between the stepped surface and both of the outer surface of the piston rod 502 and the outer surface of the stopper key 509, respectively. The gaps $C_1$ and $C_2$ are in the order of several tens of micron.

When the piston 508 comes in contact with the stopper surface 502a or 509a, the charged liquid flows out of the gap $C_1$ or $C_2$ from the vicinity of the stepped surface of the piston 508 thereby to act the cushion operation.

The piston 508 is further provided with throttled openings 510.

When vibration of large amplitude is applied to the suspension device having the above described construction, the piston rod 502 moves beyond the above fixed amount $l_1$.

This results in the piston 508 coming in contact with the stopper surface 502a or 509a and moving with the rod 502. And accordingly, the charged liquid flows through the throttled openings 510 at high speed to generate flowing resistance. The above described vibration of large amplitude is speedily damped due to the generated flowing resistance.

When vibration of small amplitude is applied to the suspension device, the piston rod 502 moves by only a small amount not more than the fixed amount $l_1$ so as not to move the piston 508. Therefore, the damping operation of the shock absorber 5 does not occur and the applied vibration of small amplitude is effectively absorbed and reduced by the suspension device.

As described above, the suspension device of the present invention is characterized in that the lower frame is connected to the upper frame by means of the parallel links and that the torsion spring is used as the spring member for imparting elastically supporting force to the parallel links. The suspension device of the present invention having the above characteristics is simple in structure, small in size and excellent in durability.

In the first embodiment, the twisting center of the torsion spring is offset from the axial center of the link plate and the twisting end of the torsion spring is axially supported by the middle portion of the link plate through the sub-link. The suspension device of the first embodiment having the above described structure enables the decrement of the twisted angle of the torsion spring when load is applied as compared with the case where the above twisting center coincides with the above axial center. This characteristic is very desirable since the fatigue of the torsion spring can be prevented thereby and therefore the durability of the torsion spring can be improved.

In the first embodiment, the torsion springs are symmetrically provided between the front and rear link plates. Therefore, the suspension device of the first embodiment can be made more compact.

Furthermore, the spring force of the torsion springs is adjusted by turning the eccentric pin provided in the shaft to change the twisted amount of each torsion spring. This results in that the elastically supporting force of the vehicle seat can be continuously adjusted.

In addition, in the first embodiment, the handle is connected to the shaft by means of the worm gear mechanism. Therefore, this suspension device requires only a small operating force in order to adjust the twisted amount of the torsion springs and the handle need not be provided with any reverse turn preventing mechanism.

Furthermore, since the handle and the shaft are horizontally arranged along the under surface of the upper frame, the suspension device can be made small in height and a large enough upward and downward operation stroke can be obtained.

And since the shaft is fitted in the groove formed in the under surface of the upper frame, any other supporting member for the shaft need not be provided.

Furthermore, the shock absorber used in the first embodiment has such a structure as to impart a fixed amount of play in the moving directions of the piston rod. This shock absorber reduces the vibration of low frequency and large amplitude due to its damping operation and effectively absorbs the vibration of high frequency and small amplitude by stopping its damping operation. This results in the vibration transmission to the vehicle seat being effectively prevented under every running condition.

The conventional shock absorber can be used as that of the suspension device of the present invention.

Figure 13:
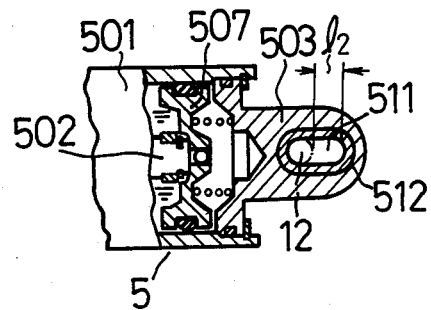
FIG. 13 is a partial sectional view of a cylinder end portion of the shock absorber of a second embodiment of the suspension device according to the present invention.

FIG. 13 is a partially sectional view of the shock absorber 5 used in a second embodiment of the suspension device according to the present invention.

In FIG. 13, the eyelet 503 is provided with a long hole 511 of which the diameter is made long in the moving direction of the piston rod 502. The periphery of the long hole 511 is protected by a ring 512 made of hard rubber or resin. Into the long hole 511 is inserted the axial body 12.

When the axial body 12 is inserted into the long hole 511, a play gap of a fixed amount $l_2$ is formed in the long hole 511 in the moving direction of the piston rod 502.

The suspension device of the second embodiment has the same operation effect as that of the first embodiment.

In the suspension device for the vehicle seat, it is preferable to increase the damping force of the shock absorber to the vibration of low frequency and large amplitude and to decrease the damping force thereof to the vibration of high frequency and small amplitude as shown in the preceding embodiments.

Furthermore, if the above described damping force can be automatically controlled in accordance with the amplitude of the applied vibration, more comfortable riding can be realized.

In following embodiments, shock absorbers which are improved for realizing the above described automatic control of the damping force, is disclosed.

FIGS. 14 to 19 illustrate a third embodiment of the suspension device according to the present invention.

Figure 14:
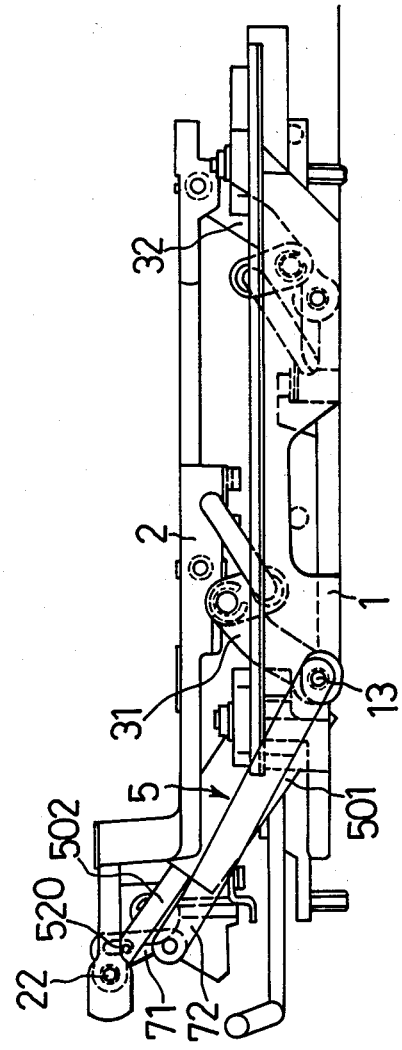
FIGS. 14 to 19 illustrate a third embodiment of the suspension device according to the present invention.
Figure 15:
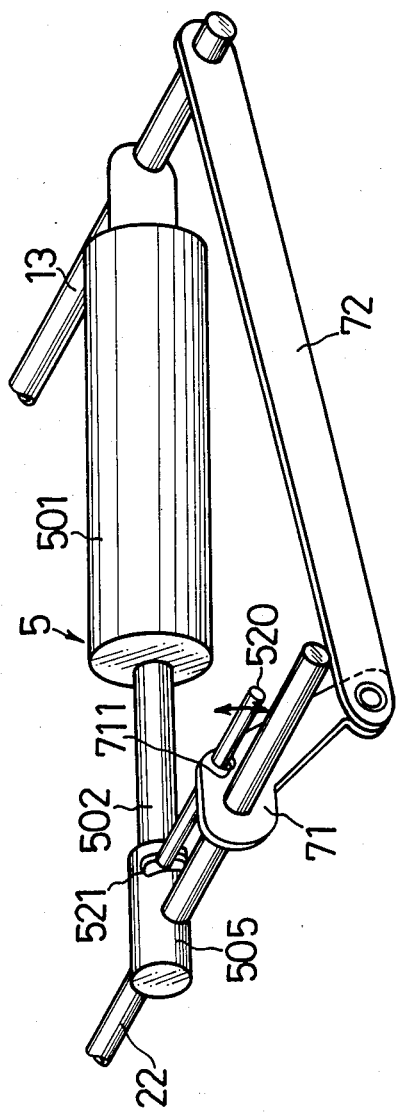

In FIGS. 14 and 15, the eyelet 505 provided in the base end of the piston rod 502 of the shock absorber 5 is connected to a supporting shaft 22 while the cylinder 501 is connected to a supporting shaft 13 provided in the lower frame 1.

The supporting shaft 22 is provided with a cam plate 71. One end of the cam plate 71 is turnably connected to the supporting shaft 22 and the other end of the cam plate 71 is connected to a link plate 72 of which one end is connected to the supporting shaft 13.

In the outer surface of the eyelet 505 is formed a long hole 521 extending in the circumferential direction thereof. A pin 520 projecting from the long hole 521 penetrates through a guide hole 711 formed in the cam plate 71.

The detailed structure of the shock absorber 5 is as follows.

Figure 16:
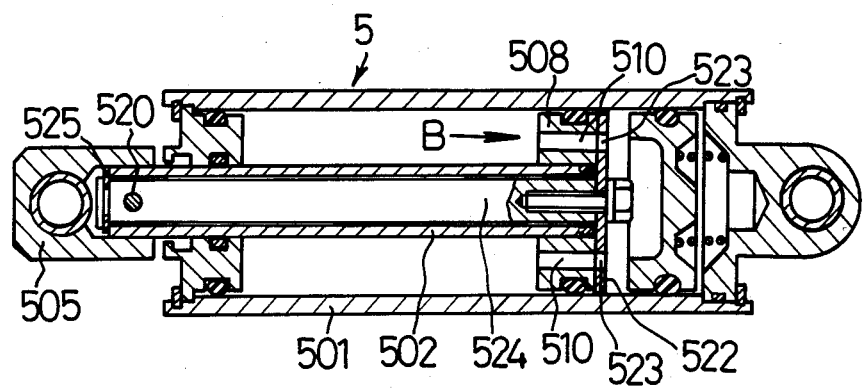

In FIG. 16, the piston 508 is slidably provided within the cylinder 501. To the piston 508 is connected one end of the piston rod 502. The piston rod 502 has a cylindrical shape and within the piston rod 502 is inserted a shaft 524 so as to be turnable about the axis thereof but fixed in the axial direction thereof.

A rotary plate 522 having the same shape as that of the end surface of the piston 508 is provided therealong. The center of the rotary plate 522 is screwed to one end of the shaft 524. By rotating the shaft 524, the rotary plate 522 is rotated in contact with the piston surface.

The piston 508 is provided with throttled openings 510 at positions symmetrical with respect to the center of the piston surface and the rotary plate 522 is provided with through holes 523 at positions corresponding to the throttled openings 510.

Figure 17:
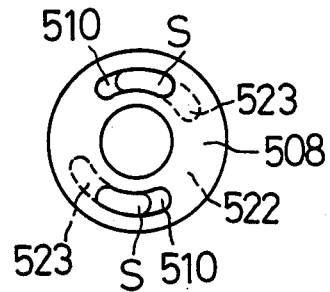

The throttled openings 510 and the through holes 523 are long holes extending in the circumferential directions of the piston 508 and the rotary plate 522 and having the same shape and the same size as shown in FIG. 17.

When the rotary plate 522 is rotated, the relative position of the throttled openings 510 and the through holes 523 is changed as shown in FIG. 17 to vary the opening area S of the throttled openings 510. This results in the flowing resistance of the charged fluid flowing the throttled openings 510 due to the movement of the piston 508 being changed and accordingly the vibration-damping force of the shock absorber 4 being changed.

From the upper end portion (left side in FIG. 16) of the shaft 524 is projected the pin 520.

Figure 18:
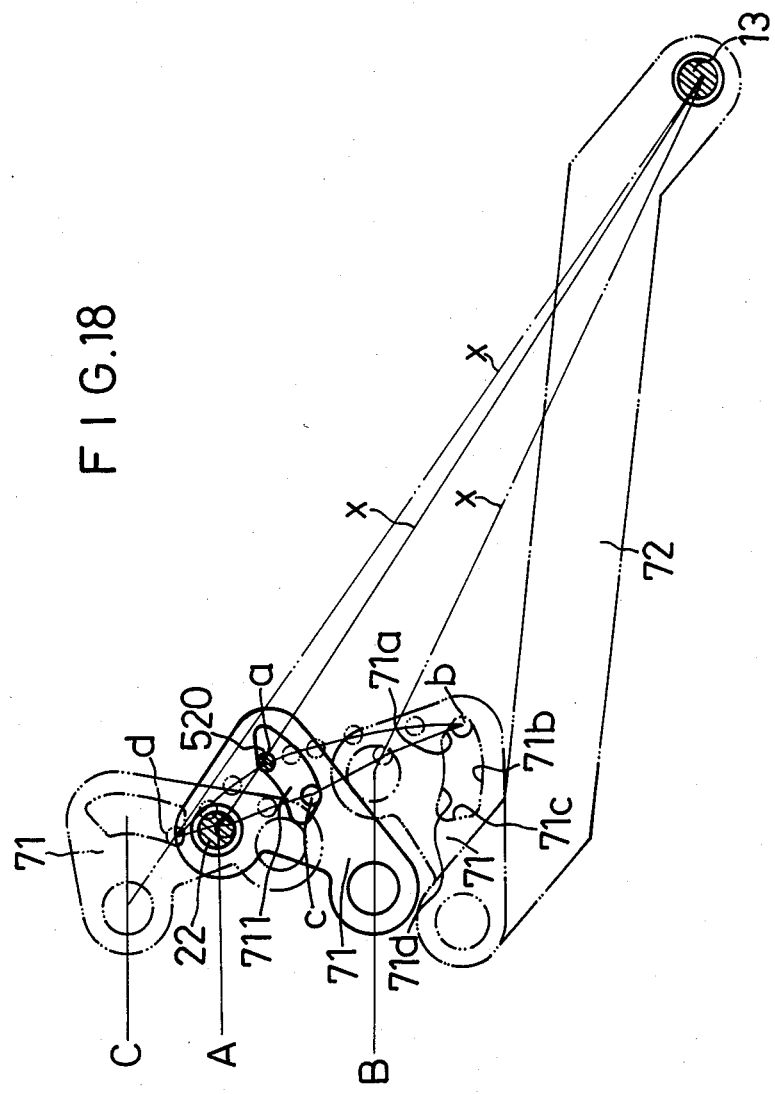

The guide hole 711 of the cam plate 71 is nearly of a trapezium and is defined by guide surfaces 71a, 71b, 71c and 71d as shown in FIG. 18. The quide surfaces 71b and 71d are formed so as to be concentrical with respect to the axial center of the supporting shaft 22.

Figure 19:
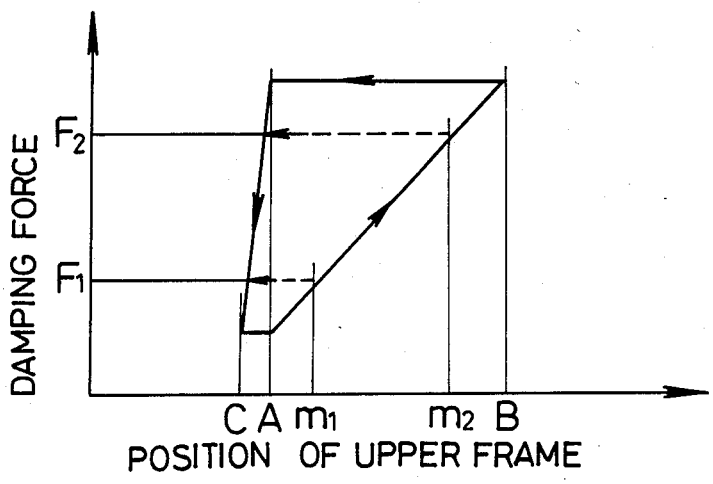

When an occupant sits on the vehicle seat, the upper frame 2 moves downward due to his load and the supporting shaft 22 is located at the position A in FIG. 18. In this state, the pin 520 is located at the position a on the line X connecting the axial centers of the supporting shafts 13 and 22 and the throttled openings 510 of the piston 508 and the through holes 523 are located at completely coincident positions. This results in the opening area S becoming maximum and accordingly the damping force of the device becoming minimum (FIG. 19).

When the vibration of large amplitude is applied and the upper frame 2 largely moves downward until the supporting shaft 22 reaches the position B in FIG. 18, the position of the cam plate 71 is changed through the link plate 72 as shown in FIG. 18. The pin 520 comes in contact with the guide surface 71a and is turned from the position a to the position b about the line X. This results in the throttled openings 510 being gradually deviated from the through holes 523 and the opening area S becoming minimum at the position B to generate large dampling force.

When the supporting shaft 22 is returned to the position A from the position B, the pin 520 moves along the guide surface 71b from the position b to the position c but scarcely turns about the line X. Therefore, at this time, a large damping force is maintained.

When the upper frame 2 moves upward beyond its original position, the supporting shaft 22 reaches the position C and the pin 520 moves from the position c to the position d after coming in contact with the guide surface 71c. At this time, the pin 520 turns about the line X in the opposite direction. This results in the throttled openings 510 becoming coincident with the through holes 523 to make the opening area S maximum and make the damping force minimum.

When the supporting shaft 22 is returned to the position A from the position c, the pin 520 moves along the guide surface 71d from the position d to the position a but scarcely turns about the line X. Therefore, at this time a small damping force is maintained.

When the vibration of small amplitude is applied to the suspension device having the above described structure, the supporting shaft 22 moves to the position $m_1$ comparatively near to the position A as shown in FIG. 19 and the damping force generated by this device is set to the small value $F_1$. This results in the vibration being effectively absorbed thereby and the transmission of the vibration being prevented.

When the vibration of large amplitude is applied to the suspension device, the supporting shaft 22 moves to the position $m_2$ away from the position A and accordingly the damping force of the device becomes a large as $F_2$ to damp the vibration of large amplitude.

Usually, vibration is applied mainly to the above described suspension device in such a direction that the upper frame 2 is moved downward from the original position, namely the direction from the position A to the position B in FIG. 19. Therefore, the damping force of the device can be varied in accordance with the moving amount of the frame 2 in this direction.

As described above, the suspension device of the third embodiment can prevent the transmission of widely ranged vibration from the vibration of low frequency and large amplitude and that of high frequency and small amplitude.

Figure 20:
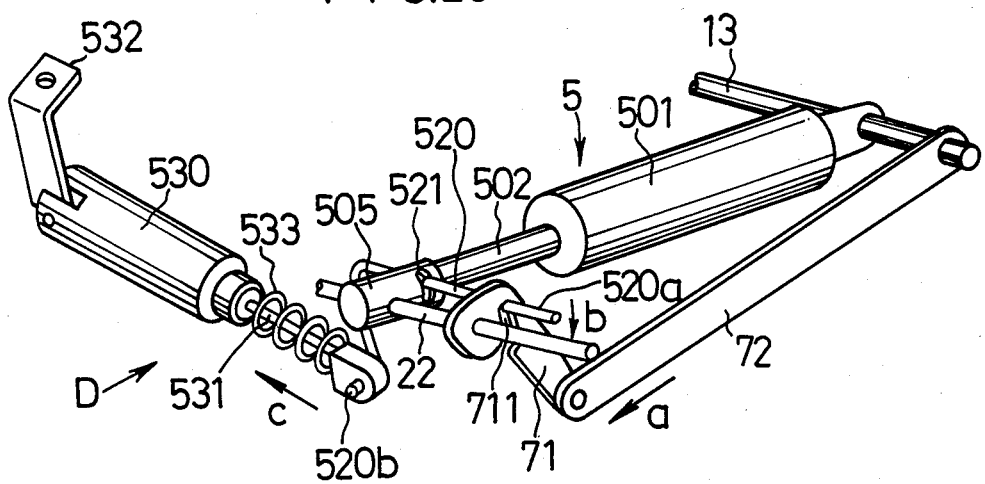
FIGS. 20 to 22 illustrate a fourth embodiment of the suspension device according to the present invention.
Figure 21:
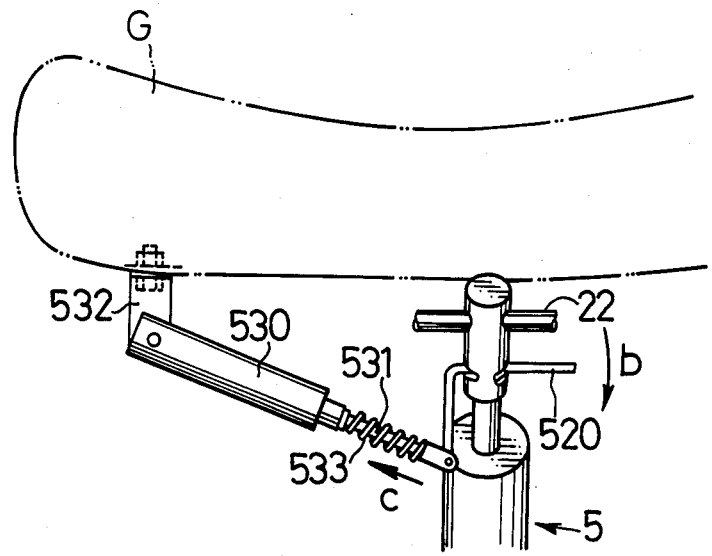
Figure 22:
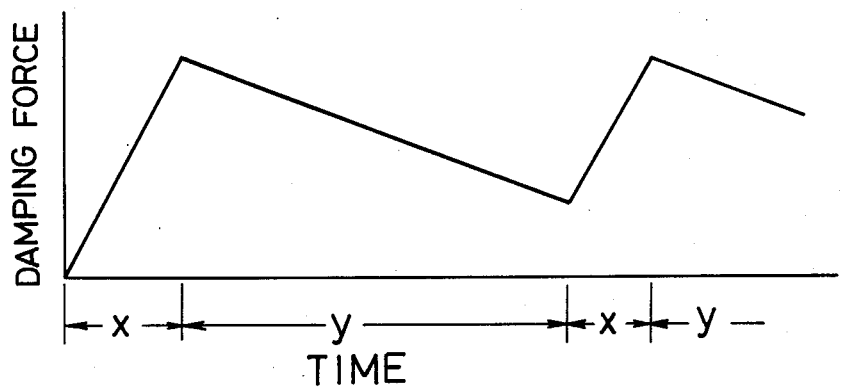

FIGS. 20 to 22 illustrate a fourth embodiment of the suspension device according to the present invention.

Usually, upward rebounding vibration in the vehicle seat is comparatively small. Therefore, even if the rotary plate 522 is completely returned to the original position to decrease the damping force of the device against the rebounding vibration as disclosed in the third embodiment, no problem occurs.

However, there are cases where comparatively large damping force is required against the rebounding vibration.

Hereinafter the structure of the shock absorber which damps the rebounding vibration will be explained. The fundamental structure thereof is substantially equal to that of the third embodiment. So, different points will be mainly explained.

In FIG. 20, the pin 520 projects from long holes 521 formed in both side surface of the eyelet 505. The pin 520 is formed into a letter L shape. One end 520a of the pin 520 is inserted into the guide hole 711 of the cam plate 71. The guide hole 711 has a generally "U" shape configuration and opens downward.

A damper 530 is secured to the under surface of a seat G through a bracket 532 as shown in FIG. 21. A piston rod 531 projects from the damper 530. The other end 520b of the pin 520 is connected to the top end of the piston rod 531.

The damper 530 has such a structure that resistance is scarcely generated in the contracting direction of the piston rod 531 and a definite resistance is generated in the expanding direction thereof. A coil spring 533 is wound around the piston rod 531 for pushing the rod 531 in its expanding direction.

When downward vibration of large amplitude is applied to the suspension device of the fourth embodiment having the above described structure, the cam plate 51 is turned about the supporting shaft 22 in the direction of the arrow a. The pin 520 is engaged with the guide hole 711 to be turned about the piston rod 502 in the direction of the arrow b. This results in the rotary plate 522 provided within the cylinder 501 being rotated and accordingly the opening area of the throttled openings 510 being reduced to generate large damping force (region x in FIG. 22). At this time, the piston rod 531 of the damper 53 is moved in its contracting direction (c)

without generating any resistance in accordance with the turn of the pin 520.

When upward rebounding vibration occurs, the cam plate 71 is turned in the opposite direction to release the engagement with the pin 520. Then, the pin 520 is turned in the returning direction opposite to that disclosed above due to the movement of the piston rod 531 pushed by the spring 533 in its expanding direction.

The above expanding movement of the piston rod 531 is gradually effected in a definite period of time because of received resistance. Therefore, the damping force of the device is gradually decreased at a definite inclination as shown in the region y of FIG. 22.

This results in comparatively large damping force being maintained against the rebounding vibration and such vibration being effectively restrained.

When no vibration of large amplitude is applied, the pin 520 completely returns to its original position to decrease the damping force of the device.

In the third and fourth embodiments, the damping force of the shock absorber is varied by changing the opening area of the throttled opening 510 of the piston 508.

Instead, such a structure as that of a fifth embodiment which will be explained next, will do.

Figure 23:
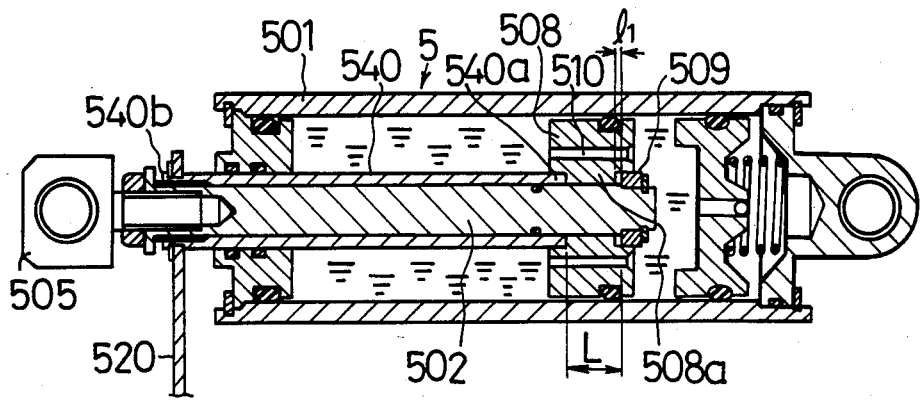
FIGS. 23 and 24 illustrate a fifth embodiment of the suspension device according to the present invention.

In FIG. 23, the piston 508 is inserted into the cylinder 501 so that the central portion 508a is movable relative to the end portion of the piston rod 502.

The central portion 508a of the piston 508 is stepped and the piston rod 502 is provided with a stopper key 509 and a stopper member 540 on the front side and the rear side of the stepped central portion 508a. The stopper member 540 has a cylindrical shape and is provided along the piston rod 502 so as to be movable relative to the outer surface of the piston rod 502. One end 540a of the stopper member 540 is opposed to the stopper key 509 at a distance L. The other end 540b projects out of the cylinder 501 along the rod 502.

A screw portion is formed in the inner surface of the other end 540b of the stopper member 540 and is screwed on a screw portion formed on the outer surface of the piston rod 502. The outer surface of the end 540b of the stopper member 540 is chamfered and one end of the pin 520 as shown in the third embodiment is fit in the chamfered outer surface of the end 540b.

By turning the stopper member 540 through the pin 520, the stopper member 540 moves leftward and rightward to vary the distance L between the stopper member 540 and the stopper key 509.

When vibration is applied, the piston rod 502 moves leftward and rightward. But the piston 508 does not move against the vibration of which the amplitude is less than $l_1$ since the distance $l_1$ is formed between the central portion 508a of the piston 508 and the opposed stopper member 540 and stopper key 509. This results in such vibration being absorbed.

When the vibration of which amplitude is not less than $l_1$ is applied, the piston 508 comes in contact with the stopper member 540 and the stopper key 509 and moves leftward and rightward with the piston rod 502. This results in the fluid flowing through the throttled openings 510 to damp such vibration.

By turning the pin 520 by the mechanism disclosed in the third and fourth embodiments the above described distance $l_1$ namely the relative movable distance of the piston 508 can be varied.

Figure 24:
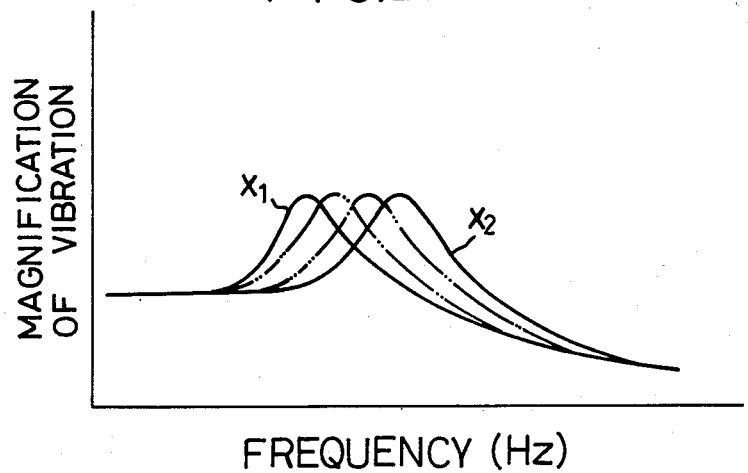

One example of the vibration-transmission characteristic of the suspension device in the case that the distance $l_1$ is la and lb (la > lb) is shown by the lines $X_1$ and $X_2$ in FIG. 24.

When the vibration of low frequency and large amplitude is applied, the stopper member 540 is rotated in accordance with the amplitude of vibration and the distance $l_1$ becomes small. This results in the vibration-transmission characteristic of the suspension device approaching the line $X_2$ from the side of the line $X_1$.

When the vibration of high frequency and small amplitude is applied, the stopper member 540 is reversed to its original position and the distance $l_1$ becomes large. This results in the vibration-transmission characteristic approaching the line $X_1$ from the side of the line $X_2$.

Thus, the vibration of large amplitude is effectively damped in accordance with the amplitude thereof and the vibration of small amplitude is effectively absorbed.

In the fifth embodiment, the distance $l_1$ is mechanically changed.

Figure 25:
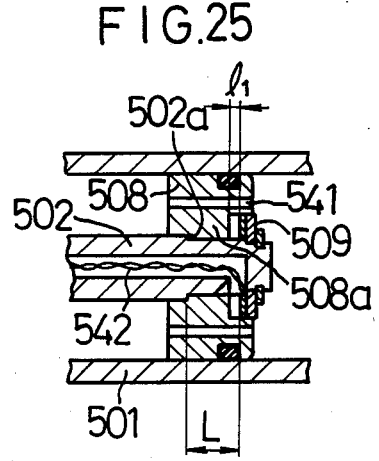
FIGS. 25 and 26 are sectional views, each illustrating the piston portion of the shock absorber of a sixth embodiment of the suspension device according to the present invention.

In the sixth embodiment shown in FIG. 25, the distance $l_1$ is electrically changed.

In FIG. 25, one end portion of the piston rod 502, which is inserted into the piston 508 is stepped to be made thin. The stepped surface 502a acts as one stopper surface. An annular bimorph piezoelectric body 541 of which the outer peripheral portion is secured to the stopper key 509 acts as the stopper member to be opposed to the stopper surface 502a at a distance L. The annular surface of the piezoelectric body 541 is opposed to the central portion 508a of the piston 508 at the distance $l_1$.

A lead wire 542 for the piezoelectric body 541 is inserted into the piston rod 502 from the outside of the cylinder 501.

Figure 26:
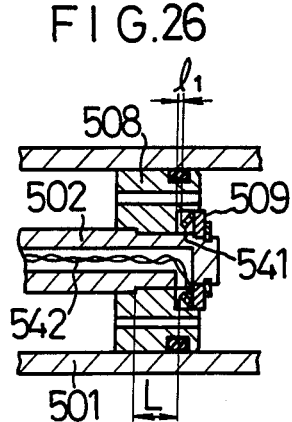

When the piezoelectric body 541 is electrified, the inner peripheral portion thereof deforms towards the central portion 508a of the piston 508 to decrease the distance $l_1$ as shown in FIG. 26.

The above described structure of the sixth embodiment has operation effect equal to that of the fifth embodiment. In this embodiment, bimetal can be substituted for the bimorph piezoelectric body 541.

Furthermore, the opening area of the throttled openings of the piston may be electrically changed as shown in the seventh to ninth embodiments.

Figure 27:
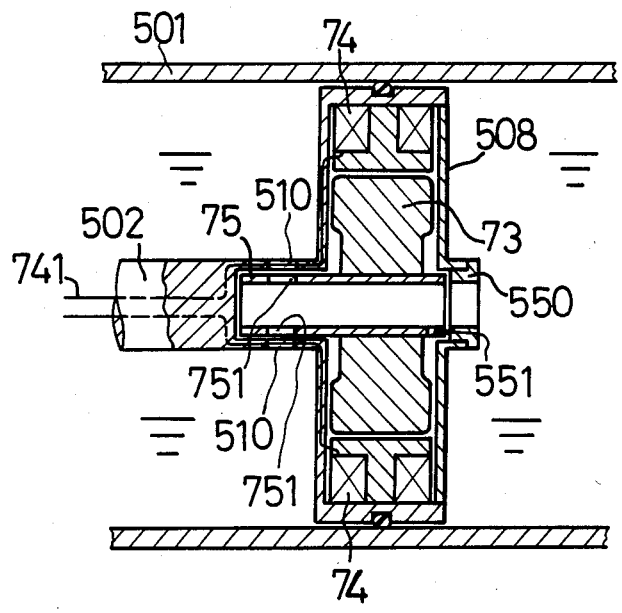
FIGS. 27 to 29 illustrate a seventh embodiment of the suspension device according to the present invention.
Figure 28:
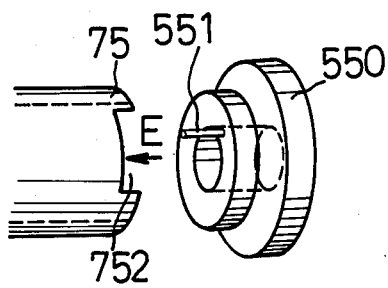
Figure 29:
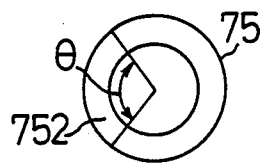

FIGS. 27 to 29 illustrate the seventh embodiment of the present invention.

In FIG. 27, the top end portion of the piston rod 502 inserted into the cylinder 501 is formed into a cylindrical shape and one portion of the cylindrical top end portion has a larger diameter to form a circular casing acting as the piston 508. Within the piston 508 is provided a thick circular disk-shaped motor rotor 73.

The motor rotor 73 is made of a magnetic body to form a magnetic pole in the outer periphery thereof. The motor rotor 73 is fitted onto the outer periphery of a cylindrical turn shaft 75 which is rotatably and coaxially disposed within the piston rod 502. In the wall of the turn shaft 75 is provided through holes 751 at positions opposed to each other and to the throttled openings 510 of the piston rod 502.

When the piston rod 502 moves leftward and rightward, the charged fluid flows through the throttled openings 510 and the through holes 751.

The open end of the piston rod 502 is covered with a opened cap 550 from which a pin 551 projects toward the turn shaft 75.

The open end surface of the turn shaft 75 opposed to the pin 551 is partially cut away through a fixed angle $\theta$ in its circumferential direction as shown by the number 752 in FIGS. 28 and 29.

The turn shaft 75 stops turning when one of cut ends thereof comes in contact with the pin 551.

And when one cut end of the turn shaft 75 comes in contact with the pin 551, the position of the through holes 751 becomes completely coincident with that of the throttled openings 510 and when the other cut end of the turn shaft 75 comes in contact with the pin 551, the position of the through holes 751 is deviated from that of the throttled openings 510 to decrease the opening area of the throttled openings 510.

In the inner wall of the piston 508, which is opposed to the outer periphery of the motor rotor 73 are provided electromagnetic coils 74. These electromagnetic coils 74 are connected to a control device (not shown) through a lead wire 741 inserted into the piston rod 502. The motor rotor 73 is rotated and reversed by changing electricity to the electromagnetic coil 74 by means of the control device.

In the seventh embodiment, the motor rotor 73 is rotated in one direction when the vibration of large amplitude is applied. The turn shaft 75 turns with the rotor 73 until coming in contact with the pin 551 so that the opening area of the throttled openings is decreased. This results in the charged fluid flowing through the throttled openings to generate large damping force.

When the vibration of small amplitude is applied, the motor rotor 73 is rotated in the opposite direction. The turn shaft 75 turns with the rotor 73 until coming in contact with the pin 551 so that the through holes 751 becomes coincident with the throttled openings 510. This results in the charged fluid flowing through the throttled opening 510 having an increased opening area, with low resistance and accordingly the damping force of the device being decreased.

As described above, in this embodiment, the opening area of the throttled opening of the piston can be changed by rotating the motor rotor. Therefore, the damping force can be easily and certainly adjusted.

And since the motor rotor is accomodated within the piston which is formed into a casing, the size of the shock absorber can be made small.

Figure 30:
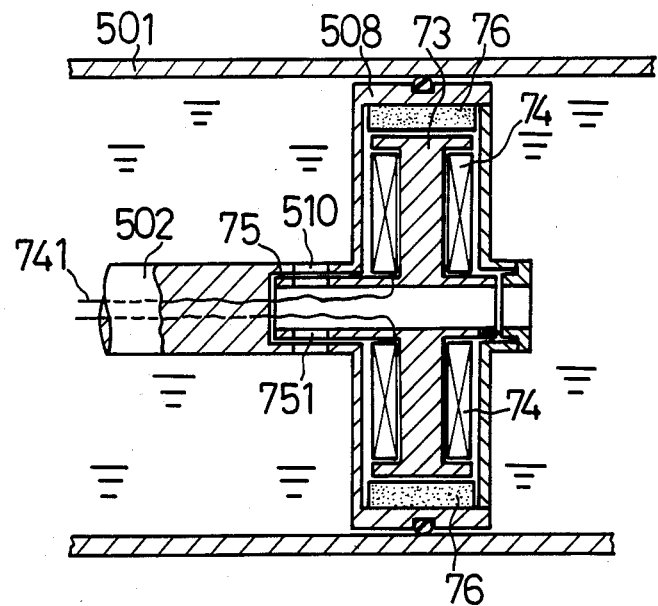
FIG. 30 is a sectional view of the piston portion of an eighth embodiment of the suspension device according to the present invention.

Furthermore, the electromagnetic coil 74 can be provided in the motor rotor 73 as shown in the eighth embodiment of the present invention. FIG. 30 illustrates the eighth embodiment.

In FIG. 30, the motor rotor 73 projects from the outer periphery of the turn shaft 75 and acts as a core for composing the electromagnetic coil 74 with a coil winding wound therearound.

In the inner wall of the piston 508, which is opposed to the electromagnetic coil 74 a permanent magnet 76 is provided. The structure of the eighth embodiment has operation effect equal to that of the seventh embodiment.

If a step motor is substituted for the motor of the present embodiment, the motor rotor can be stopped at a desired angular position. In this case, the opening area of the throttled openings can be arbitrarily adjusted.

Figure 31:
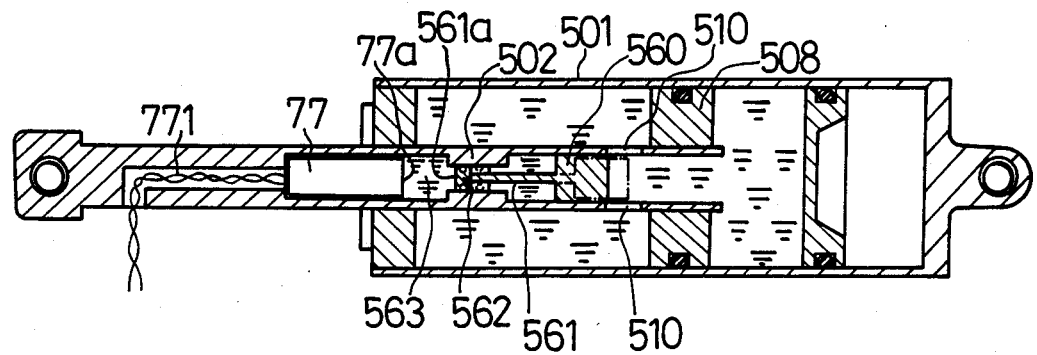
FIG. 31 is a longitudinal sectional view of a ninth embodiment of the suspension device according to the present invention.

FIG. 31 illustrate the ninth embodiment of the present invention. In FIG. 31, the right half of the piston rod 502 is formed cylindrical and on the outer periphery of the right end thereof is fit the piston 508.

In the cylindrical side wall of the piston rod 502 is provided the throttled openings 510 at opposite positions.

A spool 560 is disposed within and along the piston rod 502 so as to be movable leftward and rightward and a rod portion 561 projects from the center of the left end surface of the spool 560. The left end of the rod portion 561 is formed into a piston portion 562 having a larger diameter. The outer surface of the piston portion 562 is fluid-tightly and slidably in contact with the stepped portion of the inner surface of the piston rod 502 through O rings.

On the left side of the piston portion 562 is disposed a piezoelectric body 77 at a fixed distance. The left end of the piezoelectric body 77 is attached to the cylindrical end surface of the piston rod 502.

The piezoelectric body 77 is connected to a control device disposed outside the shock absorber through a lead wire 771 provided in the left half of the piston rod 502 and expands rightward in proportion to the applied voltage.

A small sized and strong piezoelectric actuator composed of a large number of piled piezoelectric element sheets, which is placed on the market can be employed as the piezoelectric body 77.

Between the end surface 77a of the piezoelectric body 77 and the end surface 561a of the piston portion 561 is charged incompressible liquid such as oil to form a liquid chamber 563. And the area of the surface 561a is made smaller than that of the surface 77a.

When the vibration of large amplitude is applied to the suspension device of the ninth embodiment, the voltage applied to the piezoelectric body 77 is increased to expand the body 77 by a fixed amount. This results in the inner pressure of the liquid chamber rising to push the piston portion 562 of the spool 560. As a result, the spool 560 moves rightward to the position shown by alternate long and two short dashes lines in FIG. 31.

Due to the movement of the spool 560, most part of the throttled openings 510 is covered with the spool 560 and accordingly the opening area of the throttled openings 510 is decreased.

When vibration is applied and the piston rod 502 moves, the charged liquid flows out of the throttled openings 510 of which the opening area becomes small to generate large damping force.

When the vibration of small amplitude is applied, the piezoelectric body 77 is contracted by decreasing the applied voltage to the piezoelectric body 77. This results in the inner pressure of the liquid chamber 563 lowering and accordingly the spool 560 moving leftward.

When the piston rod 502 moves due to the applied vibration, the charged liquid flows out of the throttled openings 510 of which the opening area is large, with little resistance. Therefore, the obtained damping force becomes small.

Since the liquid chamber 563 is charged with the incompressible liquid, the change of the volume of the chamber 563 due to the expansion and the contraction of the piezoelectric body 77 is always cancelled by the movement of the spool 560.

As described above, since the area $S_1$ of the end surface 561a of the spool 560 is made much smaller than the area $S_2$ of the end surface 77a of the piezoelectric body 77, the movable amount of the spool 560 becomes as large as $S_2/S_1$ times of the expanding and contracting amount of the piezoelectric body 77.

The movable amount of the spool 560 can be continuously changed by adjusting the voltage applied to the piezoelectric body 77. As a result, the most appropriate damping force of the shock absorber can be selected.

Figure 32:
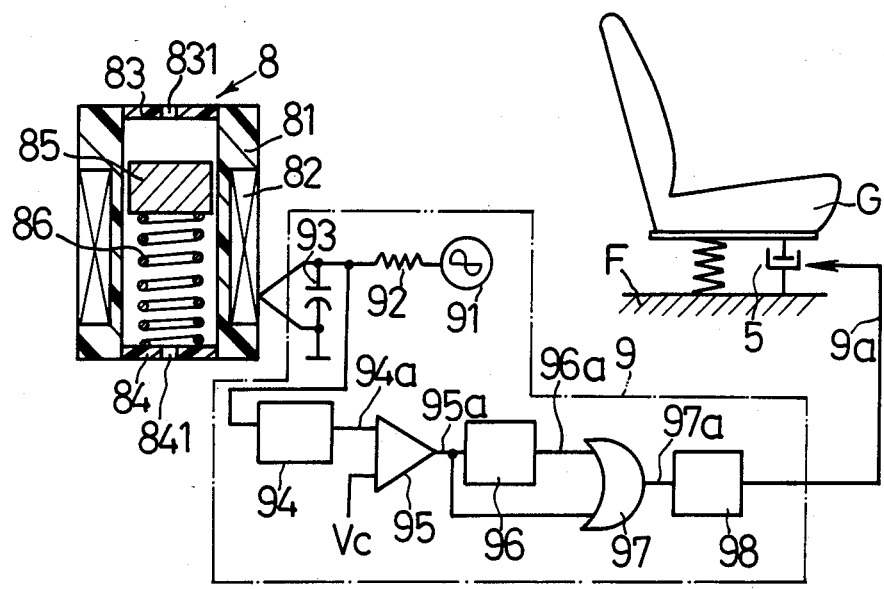

FIGS. 32 to 34 illustrate the tenth embodiment of the present invention.

In the tenth embodiment, one example of the control device for controlling the shock absorbers of the sixth to ninth embodiments is disclosed.

In FIG. 32, the suspension device for supporting a vehicle seat G on a vehicle floor F has a shock absorber 5.

The damping force of the shock absorber 5 is changed in two steps in accordance with damping force changing signal 9a. This suspension device has a resonance point at frequency $f_c$ when the damping force is small.

A vibration sensor 8 is supported by a supporting member (not shown) on the vehicle floor F near the seat G. The sensor 8 has a cylindrical housing 81 made of resin. Around the housing 81 is wound a sensing coil 82. An upper opening and a lower opening of the housing 81 are closed by lid plates 83 and 84, respectively. The lid plates 83 and 84 are provided with throttled openings 831 and 841 at the center thereof respectively.

A weight 85 is provided along the cylindrical inner surface of the housing 81 so as to move upward and downward. The weight 85 is supported on the lid plate 84 by means of the coil spring 86.

When vibration is applied to the housing 81 from the floor F, the weight 85 vibrates upward and downward. Due to the vibration of the weight 85, the air within the cylindrical housing 81 flows out of the throttled openings 831 and 841 to damp the applied vibration.

In this case, the mass of the weight 85, and the spring constant of the spring 86 are set so that the resonance point of the vibration system composed of the above components coincides with that of the suspension device of which the damping force is set small.

The control device 9 is composed of an oscillation circuit 91, a resistor 92, a condensor 93 connected to the coil 82 in parallel for forming a LC resonance circuit, a detection circuit 94, a comparator 95 for comparing the output 94a from the detection circuit 94 with a fixed voltage Vc, a timer 96, an OR gate 97 and a driver circuit 98.

Due to the upward and downward movement of the weight 85, the impedance of the sensing coil 82 is changed and the voltage outputted from the detection circuit 94 is changed.

When the housing 81 vibrates with constant amplitude, the sensor signal 94a changes with the change of frequency of the vibration of the housing 81 as shown in FIG. 34.

As is clear from FIG. 34, the signal 94a is maximum at the frequency $f_c$. This results from the weight 85 resonating at the frequency $f_c$ and moving upward and downward by a large distance.

Figure 33A:
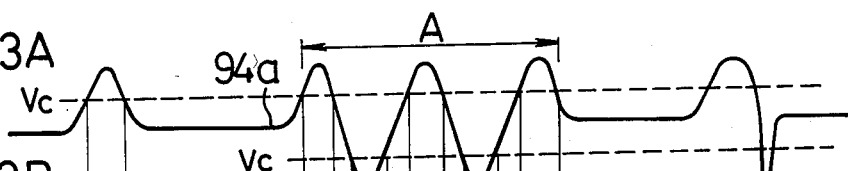
FIGS. 33A to 33D are signal waveform charts.

When the floor F vibrates with low frequency due to the running of vehicle, the weight 85 largely resonates in the vicinity of frequency fc even against the vibration of comparatively small amplitude and the voltage of the sensor signal 94a exceeds the fixed voltage Vc as shown in FIG. 33A.

Figure 33B:

Every time when the signal 94a exceeds the fixed voltage Vc, the comparator 95 generates a signal 95a of H level as shown in FIG. 33B. The signal 95a is inputted to the timer 96 and the OR gate 97.

Figure 33C:
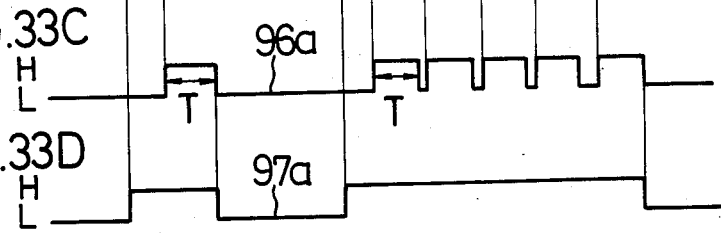

The timer 96 is started by the falling of the signal 95a and outputs a pulse signal 96a of which the duration is T as shown in FIG. 33C.

Figure 33D:
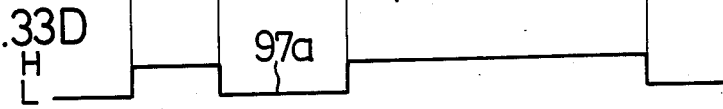

The signal 96a is inputted to the OR gate 97. The OR gate 97 outputs a signal 97a which is turned to H level while the signal 95a or 96a is inputted thereto as shown in FIG. 33D.

The signal 97a is amplified by the driver circuit 98 and is inputted to the shock absorber 5 as the damping force changing signal 9a.

And while the damping force changing signal 9a of H level is inputted to the shock absorber 5, the piezoelectric body or the motor thereof is operated to change the damping force to a larger value. This results in the suspension seat G being prevented from vibrating in resonance with the floor vibration in the vicinity of frequency fc.

The duration T is set so as to satisfy the following inequality:

$$\tfrac{1}{2}fc < T < 1/fc.$$

At the time when the weight 95 resonantly vibrates (A region of FIG. 33A), the changing signal 9a is outputted as a continuous signal. Therefore, stable control of the damping force can be secured.

When the vibration of high frequency apart from the frequency fc is applied, the movement of the weight 85 relative to the coil 82 becomes small and the sensor signal 94a does not exceed the voltage Vc. This results in the damping force changing signal 9a being turned to L level and the damping force of the shock absorber 5 being changed to a lower value to absorb the vibration of high frequency.

In order to maintain stable drivability against the vibration of high frequency and comparatively large amplitude, it is preferable to vibrate the suspension seat G with the floor F by increasing the damping force of the shock absorber 5.

In the control device of the present embodiment, the relative movement of the weight 85 is increased against the vibration of high frequency and large amplitude and the level of the sensor signal 94a rises therethroughout to exceed the voltage Vc. This results in the changing signal 9a being turned to H level to increase the damping force of the shock absorber 5.

As described above, the control device of the present embodiment enables the proper change of the damping force of the shock absorber and enables the suspension device to prevent the transmission of widely ranged vibration of from low frequency to high frequency.

Particularly, the control device of the present embodiment enables the reliable detection of the vibration of low frequency and comparatively small amplitude. Therefore, by increasing the damping force of the shock absorber, the seat can be effectively prevented from vibrating in resonance with such vibration.

In the present embodiment, the moving amount of the weight relative to the housing is detected. Instead, the detection of speed or acceleration of the weight will do. And in the present embodiment, the damping force of the shock absorber is changed in two steps. In addition, the control device of the present embodiment can be applied to the suspension seat by which the damping force can be changed in many steps. In this case, a plurality of fixed voltage Vc are set in response to the steps.

Furthermore, if sufficiently large damping force can be obtained when air flows between the weight 85 and the housing 81 due to the upward and downward movement of the weight 85, the throttled openings 831 and 841 are not always required.

What is claimed is:

1. A suspension device for elastically supporting a vehicle seat on a vehicle floor and for preventing the transmission of vibration to the vehicle seat, comprising:

a lower frame secured to the vehicle floor;

an upper frame disposed above said lower frame in parallel with said lower frame for mounting the vehicle seat;

link plates disposed on the front side and the rear side of a vehicle in parallel with each other for connecting said lower frame and said upper frame;

at least one torsion spring made of a spring rod of which both ends are twisted to each other at a predetermined angle about a twist center; said at least one torsion spring being provided near one of the connecting portions of said link plates and said lower and upper frames;

said at least one torsion spring being supported by one of said lower frame and said upper frames; one end of said at least one torsion spring being in contact with one of said lower frame and said upper frame, which supports said at least one torsion spring and the outer end of said at least one torsion spring being in contact with one of said lower frame and said upper frame, which supports at least one torsion spring and the other end of said at least one torsion spring being connected to a middle portion of one of said link plates;

said at least one torsion spring twisting with the relative displacement of said upper frame and said lower frame to impart elastic supporting force to said link plate to which said at least one torsion spring is connected; and a shock absorber provided between said lower frame and said upper frame for damping the relative vibration of said lower frame and said upper frame.

2. A suspension device according to claim 1, wherein said twist center of said at least one torsion spring is supported by one of said lower frame and said upper frame, which is located near said at least one torsion spring at a position away from the center of connection of said one of connecting portions of said link plates and said lower and upper frames; one end of said at least one torsion spring is in contact with one of said lower frame and said upper frame, which supports said spring rod, and the other end of said at least one torsion spring is located near the middle portion of one of said link plates; said suspension device further comprising at least one sub-link for connecting said middle portion of each of said link plates and said other end of said at least one torsion spring.

3. A suspension device according to claim 1, wherein said shock absorber comprises a cylinder charged with a liquid, a piston having throttled openings, which are inserted into said cylinder, and a piston rod of which a top end is connected to said piston, a base end of said piston rod is connected to one of said lower frame and said upper frame, and said cylinder is connected to one of said upper frame and said lower frame.

4. A suspension device according to claim 1, wherein said at least one torsion spring is a plurality of torsion springs which are located near said connecting portions of said link plates at positions symmetrical with respect to a certain point and between said link plates.

5. A suspension device according to claim 1, further comprising an adjusting handle having a handle shaft turnably supported by one of said lower frame and said upper frame, and an eccentric pin projecting from the top end surface of said handle shaft so as to be away from the center of the top end surface, the top end of said eccentric pin being in contact with said one end of said at least one torsion spring whereby said adjusting handle is turned to change the twist amount of said torsion spring through said eccentric pin.

6. A suspension device according to claim 3, wherein said shock absorber has a predetermined play in the moving direction of said piston rod.

7. A suspension device according to claim 6, wherein said piston is loosely fit on said top end of said piston rod so as to be movable with respect to said piston rod, and stopper members are provided in said top end so as to be opposed to each other through said piston for limiting the relative movement of said piston to a predetermined amount.

8. A suspension device according to claim 6, wherein said cylinder is provided with a long hole in the connecting portion with one of said frames, said long hole has a larger diameter in the moving direction of said piston rod, and into said long hole is inserted a shaft body provided in one of sai frames.

9. A suspension device according to claim 3, wherein said shock absorber further comprising:

a turn plate turnably provided in sliding contact with the end surface of said piston for changing the opening area of said throttled openings with the turn of said turn plate;

a turn shaft inserted into a cylindrical piston rod; one end of said turn shaft being secured to the center of said turn plate and the other end of said turn shaft being located outside said cylinder; and a turn shaft driving mechanism for turning said turn shaft in accordance with the change of the relative position of said upper frame and said lower frame due to the vibration applied to said suspension device.

10. A suspension device according to claim 9, wherein said turn plate is provided with through holes at positions corresponding to said throttled openings whereby the relative posiiton of said throttled openings and said through holes is changed in accordance with the turn of said turn plate to change the opening area of said throttled openings.

11. A suspension device according to claim 9, wherein fron said the other end of said turn shaft is projected a pin member, and said turn shaft driving mechanism is provided with a cam plate operated in accordance with the change of the relative position of said upper frame and said lower frame to turn said pin member about said turn shaft, engaging with said pin member.

12. A suspension device according to claim 11, wherein said pin member has a return mechanism for turning said pin member in its return direction slowly when said cam is disengaged from said pin member.

13. A suspension device according to claim 12, wherein said return mechanism has a spring member for pushing said pin member in its return direction and a damping device generating resistance in the pushing direction of said spring member.

14. A suspension device according to claim 7, wherein one of said stopper members is movable to change the distance between said stopper members; and said shock absorber has a moving mechanism for moving said one of said stopper members.

15. A suspension device according to claim 14, wherein said one of said stopper members is made of a cylindrical body of which the inner wall is provided with a screw portion in which the outer wall of said piston rod is screwed; one end of said one of said stopper members is opposed to the other stopper member and the other end of said one of said stopper members is located outside said cylinder whereby said one of said stopper members moves in the axial direction of said piston rod by turning said the other end of said one of said stopper members about said piston rod.

16. A suspension device according to claim 15, wherein from said the other end of said one of said stopper members is projected a pin member, said moving mechanism has a cam plate which operates in accordance with the change of the relative position of said upper frame and said lower frame to turn said pin member about said piston rod, engaging with said pin member.

17. A suspension device according to claim 16, wherein said pin member has a return mechanism for slowly turning said pin member in its return direction when said pin member is disengaged from said cam plate.

18. A suspension device according to claim 17, wherein said return mechanism is composed of a spring member for pushing said pin member in its return direction and a damping device for generating resistance in the pushing direction of said spring member.

19. A suspension device according to claim 7, wherein one of said stopper members is made of one of a bimorph piezoelectric body and a bimetal body, each of which deforms in the direction of the other opposed stopper member to change the distance between said stopper members upon receiving electricity.

20. A suspension device according to claim 3, wherein said piston rod is formed into a cylindrical body of which the side wall is provided with said throttled openings, said piston is formed into a casing body, and said shock absorber further comprises a motor rotor provided within said piston, an axis of rotation of said motor rotor being coaxially and rotatably inserted into said piston rod, and said axis of rotation being formed into a cylindrical body of which the cylindrical wall is provided with through holes at positions corresponding to said throttled openings whereby the relative position of said throttled openings and said through holes is changed and consequently the opening area of said throttled openings is changed by electrifying said motor rotor to be turned.

21. A suspension device according to claim 3, wherein said piston rod is formed into a cylindrical body of which the side wall is provided with throttled openings, and said shock absorber further comprises a spool slidably inserted into said piston rod for closing said throttled openings in accordance with the moving position of said spool to change the opening area of said throttled openings, a piezoelectric body of which the end surface is opposed to the end surface of said spool at a distance and which deformes in the direction of said spool upon receiving electricity, and a liquid chamber defined by said end surface of said spool and said end surface of said piezoelectric body and charged with an incompresible liquid, the area of said end surface of said spool being made smaller than that of said end surface of said piezoelectric body whereby said spool is moved due to the generated inner pressure within said liquid chamber when said piezoelectric body is electrified.

22. A suspension device according to claim 19, further comprising a vibration sensor installed on the vehicle floor, and a control means, said vibration sensor having a weight, a spring member, and a damping member, said weight, said spring member and said damping member comprising a vibration system having a resonance frequency equal to that of said suspension device and said vibration sensor generating an output signal responding to the vibration movement of said weight, and said control means generating an electrifying signal when said output signal exceeds a predetermined level.

23. A suspension device according to claim 20, further comprising a vibration sensor installed on the vehicle floor and a control means, said vibration sensor having a weight, a spring member, and a damping member, said weight, said spring member and said damping member comprising a vibration system having a resonance frequency equal to that of said suspension device and said vibration sensor generating an output signal responding to the vibration movement of said weight, and said control means generating an electrifying signal when said output signal exceeds a predetermined level.

24. A suspension device according to claim 21, further comprising a vibration sensor installed on the vehicle floor and a control means, said vibration sensor having a weight, a spring member, and a damping member, said weight, said spring member and said damping member comprising a vibration system having a resonance frequency equal to that of said suspension device and said vibration sensor generating an output signal responding to the vibration movement of said weight, and said control means generating an electrifying signal when said output signal exceeds a predetermined level.

25. A suspension device according to any one of claims 22, 23 and 24 wherein said vibration sensor has a cylindrical housing supported on the vehicle floor by a supporting member, a sensing coil is wound around said cylindrical housing, said weight is provided within said housing so as to be movable upward and downward along the cylindrical wall, and is supported by said spring member, upper and lower openings of said housing are covered with lid members as said damping member, each of which is provided with a throttled opening, and said sensing coil changes its impedance in response to the moving amount of said weight moving upward and downward due to the applied vibration and generates said output signal.

* * * * *